United States Patent
Springer, IV et al.

(10) Patent No.: US 12,353,812 B1
(45) Date of Patent: Jul. 8, 2025

(54) LOGICAL EQUIVALENCE CHECK FOR CIRCUITS

(71) Applicant: Google LLC, Mountain View, CA (US)

(72) Inventors: Robert Coleman Springer, IV, San Jose, CA (US); Christopher Daniel Leary, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 638 days.

(21) Appl. No.: 17/737,883

(22) Filed: May 5, 2022

(51) Int. Cl.
*G06F 30/3323* (2020.01)
*G06F 30/323* (2020.01)
*G06F 30/327* (2020.01)
*G06F 30/367* (2020.01)
*G06F 30/398* (2020.01)
*G06F 119/12* (2020.01)

(52) U.S. Cl.
CPC ........ *G06F 30/3323* (2020.01); *G06F 30/327* (2020.01); *G06F 30/323* (2020.01); *G06F 30/367* (2020.01); *G06F 30/398* (2020.01); *G06F 2119/12* (2020.01)

(58) Field of Classification Search
CPC .. G06F 30/3323; G06F 30/327; G06F 30/323; G06F 30/367; G06F 30/398; G06F 2119/12
USPC ........... 716/107, 111, 103, 104, 136; 703/15
See application file for complete search history.

(56) References Cited

U.S. PATENT DOCUMENTS

| | | | |
|---|---|---|---|
| 6,226,776 B1 * | 5/2001 | Panchul | G06F 30/30 716/102 |
| 6,226,777 B1 * | 5/2001 | Zhang | G06F 30/3323 716/106 |
| 7,137,084 B1 * | 11/2006 | Chen | G06F 30/33 716/107 |
| 7,266,790 B2 | 9/2007 | Pandey et al. | |
| 7,337,100 B1 * | 2/2008 | Hutton | G06F 30/39 716/108 |
| 7,711,525 B2 | 5/2010 | Ganai et al. | |

(Continued)

OTHER PUBLICATIONS

Chen et al., Chinese Patent Document No. CN-113779907-A, published Dec. 10, 2021, 3 pages including abstract, claim and 1 drawing. (Year: 2021).*

(Continued)

*Primary Examiner* — Phallaka Kik
(74) *Attorney, Agent, or Firm* — Fish & Richardson P.C.

(57) ABSTRACT

Methods, systems, and apparatus, including computer programs encoded on computer storage media for performing logic equivalence check on a circuit design are described. In one aspect, a method includes receiving a request for performing operations of a logical equivalence check of a circuit design and determining, based on one or more criteria, to perform the operations using pipeline stages. In response to the determination, a plurality of pipeline stages of the circuit design that is in a high level representation are determined. For each stage of the plurality of pipeline stages, data corresponding to a high level representation of the stage are obtained, and data corresponding to a low level representation of the stage that corresponds to the high level representation of the stage are obtained. The high level representation and the low level representation are compared. An output is generated based on the comparison.

20 Claims, 5 Drawing Sheets

(56) References Cited

U.S. PATENT DOCUMENTS

| | | | | |
|---|---|---|---|---|
| 7,890,903 | B2* | 2/2011 | Weber | G06F 30/3312 716/106 |
| 8,739,088 | B1* | 5/2014 | Ou | G06F 30/30 716/106 |
| 8,762,907 | B2 | 6/2014 | Shrivastava | |
| 8,914,758 | B1 | 12/2014 | Kundu et al. | |
| 10,366,190 | B2* | 7/2019 | Titley | G06F 30/327 |
| 11,010,511 | B2 | 5/2021 | Amaru et al. | |
| 11,126,780 | B1 | 9/2021 | Chung et al. | |
| 11,507,719 | B1* | 11/2022 | Kundu | G06F 30/3323 |
| 2002/0138812 | A1* | 9/2002 | Johannsen | G06F 30/3323 716/103 |
| 2005/0251775 | A1* | 11/2005 | Wood | H03B 5/1852 716/132 |
| 2009/0235223 | A1* | 9/2009 | Kakui | G06F 30/33 716/104 |
| 2009/0288059 | A1* | 11/2009 | Dimou | G06F 30/35 716/132 |
| 2010/0153893 | A1* | 6/2010 | Bartolotti | G06F 30/327 716/107 |
| 2011/0179395 | A1* | 7/2011 | Smirnov | G06F 30/327 716/126 |
| 2011/0276934 | A1* | 11/2011 | Koelbl | G06F 30/3323 716/108 |
| 2013/0227505 | A1* | 8/2013 | Tanimoto | G06F 30/3323 716/107 |
| 2016/0224714 | A1* | 8/2016 | Bencivenga | G06F 30/3323 |
| 2017/0212968 | A1 | 7/2017 | Diao et al. | |
| 2021/0110092 | A1 | 4/2021 | Possignolo et al. | |

OTHER PUBLICATIONS github.com [online], "Internal Abseil cleanup" Oct. 2020, retrieved on May 5, 2022, retrieved from: <https://github.com/google/xls/blob/63d741152b6c9fced01f8cd8b3b558a28b523d17/xls/solvers/z3_lec.h#L62>, 4 pages.

* cited by examiner

LOGICAL EQUIVALENCE CHECK FOR CIRCUITS

TECHNICAL FIELD

This specification relates to performing logical equivalence checks for integrated circuits.

BACKGROUND

Logical equivalence check (LEC) plays an important role in integrated circuit (IC) design, for example, in the design of application-specific integrated circuits (ASICs). In general, a circuit can be designed with particular architectures and functionalities described in a high-level programming language, e.g., C++ or Verilog, and the high-level designs are generally compiled and processed by respective tools to lower levels, e.g., register transfer level (RTL), synthesis level, or gate level. The logical equivalence check can be performed to determine whether a particular functionality/design described for a circuit at a high level is equivalent to a function/design implemented at a lower level, e.g., if circuit components are placed and routed correctly to perform the prescribed functionality in the high-level language.

SUMMARY

The techniques described in the following specification are related to performing LECs for circuits. In particular, the techniques can perform an LEC for a circuit by determining or obtaining data representing pipeline stages of the circuit, and performing LEC for each stage to determine whether the design or functionality of the circuit has been correctly implemented from a high level language to a low level (e.g., the gate level).

A design for an IC can include a general architecture for arranging and routing data or other signals between components for performing pre-determined functionalities. An architecture for an IC, also referred to as a chip architecture representation, generally includes a representation of an engineered (or to be engineered) electronic or electromechanical block, component, or system on the chip. As described above, a chip architecture can include information regarding the placements of one or more components and the routing of signals between the one or more components. These components can include, for example, computing units such as multiplication units, addition units, counters, registers, and reduction units. A computing unit can include, e.g., be implemented using, one or more logic gates, e.g., OR gates, AND gates, NOT gates, and XOR gates, just to name a few examples.

A design for an IC can be encoded in a high level programming language, for example, a hardware description language (HDL) such as Verilog, or a human readable programming language C or C++. A high level programming language can simplify the process for designing IC or IC functionalities and supports designs at many levels of abstraction, for example, at behavioral level, register transfer level, and/or gate level. For designing at the behavioral level, functionalities or algorithms are described in a sequential order, which includes a set of instructions to be executed according to the sequential order. Structural realization of a design normally is not included at the behavioral level. For designing at the register transfer level (RTL), circuits' characteristics or functionalities are generally specified by operations and transfer of data between registers. The programming code at the RTL is generally synthesizable. For designing at the gate level, characteristics or functionalities of a circuit can be described by logical links and respective timing properties within the logical level. Signals at this level are generally discrete signals with predetermined logical values, e.g., zero or one. Although a chip design can be described in high-level language at a low level (e.g., gate level), it is generally favorable to design a chip or chip functionalities at behavioral level or RTL. Designs specified at a high level can be compiled or converted into low level representations using one or more automation tools (e.g., synthesis tools).

For simplicity, in the following specification, a circuit design represented using a high level programming language is also referred to as a design or a functionality represented at a high level, and a circuit design represented at gate level is also referred to as a design or a functionality represented at a low level.

Logical equivalence check is critical for circuit design. For example, when a high level representation of a circuit is compiled or converted to a low level representation, one or more conversion/transcription errors might occur, which causes one or more functionalities of the circuit implemented at the low level to become different from the functionalities of the circuit specified at the high level. In some implementations, these conversion/transcription errors can render the circuit design inoperable or erroneous and the corresponding IC manufactured based on the low level representation can malfunction.

Some LEC techniques generally perform a single LEC on a whole circuit. For example, the single LEC is performed to examine all functionalities specified in the high level match with counterparts implemented in the low level. An LEC is often performed using one or more different solvers, e.g., Satisfiability (SAT) solvers or Satisfiability Modulo Theories (SMT) solvers. SAT and SMT solvers can determine if a symbolic Boolean expression equality is true or false. In particular, a SAT solver can receive a particular type of input formula and output either a satisfying Boolean assignment to variables used in the formula if the formula is consistent or an unsatisfying Boolean if it is not consistent. A SMT solver is a special type of SAT solver, which supports more types of variables than SAT solvers, e.g., constants, functions, and predicate symbols.

Techniques that include performing LECs on entire circuits are unscalable for large circuits. More specifically, the process of performing LECs using SMT and SAT solvers is an NP-complete problem that scales up quickly with an increasing number of nodes and/or gates in a circuit design graph. In some implementations, it would take decades to complete performing LECs on a reasonable-size circuit if the LEC is performed on the entire circuit at once. The techniques described herein can resolve at least the above-noted problems.

According to one aspect, the document describes a method for performing checks on one or more functionalities in an integrated circuit design. The method includes receiving a request for performing operations of a logical equivalence check of a circuit design; determining, based on one or more criteria, to perform the operations using pipeline stages; in response to determining to perform the operations using pipeline stages: determining a plurality of pipeline stages of the circuit design that is in a high level representation; and for each stage of the plurality of pipeline stages: obtaining data corresponding to a high level representation of the stage, obtaining data corresponding to a low level representation of the stage based on the data corresponding to the high level representation of the stage, and comparing the data corresponding to the high level representation to the data corresponding to the low level representation for the stage; and generating an output, based on the comparison for each stage of the plurality of pipeline stages, in response to the request.

In some implementations, the method includes providing the output data to the hardware architecture template, instantiating a hardware architecture based on the determined design parameter values, and manufacturing a hardware component using the hardware architecture.

Other embodiments of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

Particular embodiments of the subject matter described in this specification can be implemented to realize one or more of the following advantages. The techniques described in this document can efficiently perform LECs for a large circuit design. In particular, the techniques can determine one or more pipeline stages in a circuit design, analyze and track data transfer between pipeline stages, and perform LECs for each pipeline stage to determine whether the circuit design in whole or all functionalities in the circuit design satisfies the LECs. In this way, the techniques can enable performing LECs on a large circuit design, which normally takes too much time or is even impossible for existing techniques of performing LECs. The described techniques can further reduce computation and time cost by avoiding brute force searches to determine multiple stages, rather, the techniques can determine pipeline stages based on analyzing the circuit pipeline, e.g., data transfer across different modules or components in the circuit design.

In addition, the techniques described herein can robustly perform LECs on different circuit designs. For example, the described techniques can automatically determine whether to perform pipeline-stage LEC or a regular LEC on a circuit design by analyzing circuit characteristics, and comparing the characteristics with predetermined threshold values and/or other criteria. In this way, the described techniques can perform pipeline-stage LECs for circuit designs for which a regular LEC cannot otherwise be successfully performed within a particular time window.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
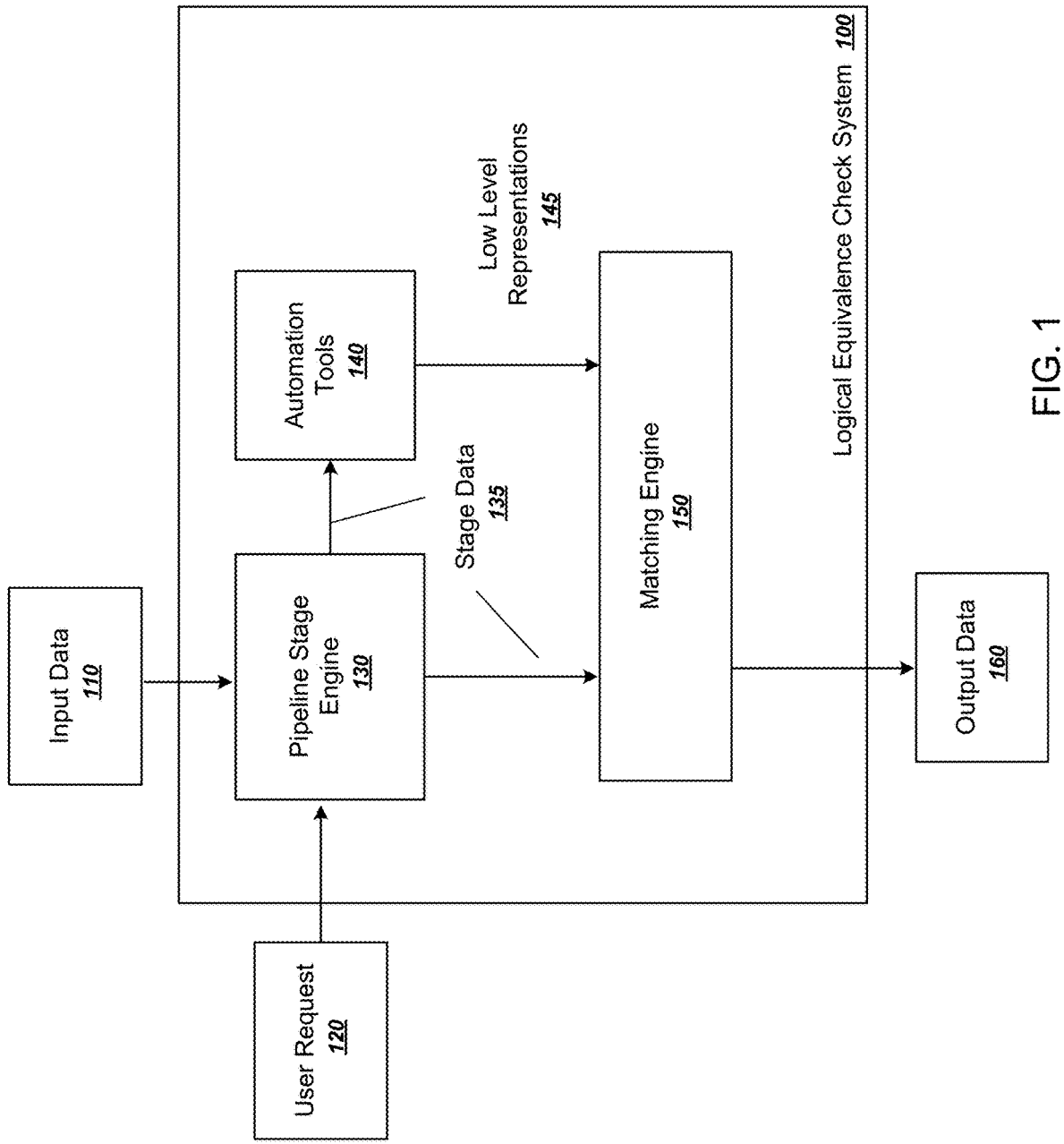
FIG. 1 illustrates an example of a logical equivalence check system.

FIG. 1 illustrates an example of logical equivalence check (LEC) system 100. The logical equivalence check system 100 is an example of a system implemented on one or more computers in one or more locations, in which systems, components, and techniques described below can be implemented. Some of the components of the logical equivalence check system 100 can be implemented as computer programs configured to run on one or more computers.

As shown in FIG. 1, the logical equivalence check system 100 can process input data 110 to generate output data 160, e.g., in response to receiving a user request 120.

More specifically, the input data 110 can include a high level representation of a circuit design. For example, the circuit design can be designed and specified using a high level programming language such as Verilog. In some implementations, the input data 110 can include data representing a size for logical operations in the circuit design. For example, the size can be 2 Bytes, 3 Megabytes, 500 Megabytes, 1 Gigabytes, or any other suitable sizes. The input data 110 can include data representing a cost for manufacturing one or more components in the circuit design. In addition, the input data 110 can include a schedule for executing one or more functionalities of the circuit design, which can be used by the logical equivalence check system 100 to determine one or more pipeline stages. The details of generating multiple pipeline stages are described below. Furthermore, the input data 110 can include data representing a list of nodes and/or components for respective functionalities. Each component can generally represent a computing unit or a sub-unit of the computing unit configured for performing a particular operation, e.g., an addition unit.

The user request 120 can include data representing user-specified parameters for performing an LEC. For example, the user-specified parameters can include a user-specified time period for the system 100 to perform the LEC, e.g., a few minutes, a couple of hours, or a few days. The user-specified parameters can include one or more criteria for the system 100 to determine whether to perform an LEC using pipeline stages for a circuit design or to perform an LEC over the entire circuit design without using pipeline stages. The one or more criteria can include a threshold size for a circuit design (e.g., a high level representation size), or a threshold cost or value for manufacturing a circuit based on the circuit design. For example, the one or more criteria can include a determination of whether a circuit design includes one or more multipliers. As another example, the one or more criteria can further include a determination of whether a circuit design includes one or more multipliers that have a bit width greater than 12 bits. In some implementations, the criteria can further include a combination of a circuit size and the cost of manufacturing the corresponding size. For example, if a circuit design has a size that is below a threshold size and has a number of multipliers that is less than a threshold value, the system would determine to perform the LEC over the entire the circuit. If the circuit design has a size below a threshold size but includes a number of multipliers that is above a predetermined number, the system would determine to perform pipelined LEC for the circuit.

The logical equivalence check system 100 can include a pipeline stage engine 130 configured to determine multiple pipeline stages for a circuit design included in the input data 110. The multiple pipeline stages can be included in stage data 135 as output from the pipeline stage engine 130. As described above, the input data can include one or more schedules for performing one or more functionalities specified in a circuit design. The pipeline stage engine 130 can determine multiple groups of nodes based on one or more schedules. Each group of nodes can be included in a respective stage. The circuit design can be divided into multiple stages and each stage is connected with one or more other stages to form a pipe-like structure for executing respective instructions. In this way, a circuit design with pipeline stages can improve efficiency and throughput for executing instructions.

A pipeline stage generally represents a set of nodes, a set of components connected by respective groups of nodes to collaboratively execute respective instructions, and/or a set of nodes or components corresponding to a particular time period. A node generally represents a junction point where two or more circuit components are coupled with each other. Each group of nodes can connect multiple components configured to perform respective functionalities substantially within a common stage, e.g., components connected by a group of nodes can substantially process common inputs, generate outputs that other nodes need to receive as inputs, or complete respective tasks/functionalities substantially at the same time or for a substantially same time period.

For example, assume that a circuit design includes a multiplication unit, at a first pipeline stage with corresponding instructions. The multiplication unit can execute a first set of operations using components connected by a first group of nodes (e.g., registers). The first set of operations includes receiving and storing vector elements of a matrix into respective registers. The multiplication unit can, at a second pipeline stage, execute a second set of operations using components connected by a second group of nodes (e.g., registers). The second set of operations includes receiving and storing scalar elements of a vector into respective registers. The multiplication unit can, at a third pipeline stage, execute a third set of operations using components connected by a third group of nodes (e.g., reduction unit). The third set of operations includes multiplying each scalar element with a respective vector element to generate respective reduction outputs.

For simplicity, the term "pipeline stage" used in the following specification is also referred to as a "stage", which can be also represented by a respective group of nodes and corresponding components connected between the respective group of nodes at a high level. The system can also determine one or more boundaries each connecting two neighboring stages. The details of a stage and a boundary are described in connection with FIG. 2.

As described above, the stage data 135 generated from pipeline stage engine 130 are represented at a high level, for example, any suitable intermediate representation level that is higher than the register transfer level.

Nodes represented at a high level (e.g., the intermediate representation level) in the following specification are also referred to as IR nodes for simplicity. Alternatively, the stage data 135 can be represented using a high level programming language such as Verilog, which can be processed into low level representations for performing the LECs.

The logical equivalence check system 100 can further include one or more automation tools 140 configured to process stage data 135 for generating low level representations 145 of the stage data 135. More specifically, the automation tools 140 can convert or compile high level representations of the stage data into low level representations. For example, the automation tool 140 can convert multiple IR nodes in a stage from stage data 135 into multiple netlists corresponding to the multiple IR nodes at a gate level. The details of converting high level representations of a stage into a low level representation of the stage are described below in connection with FIG. 3.

In some implementations, the input data 100 can include both a high level representation of a circuit design and a corresponding low level representation. The low level representation can be generated by an external engine, computer, or device. In such situations, the system 100 can omit the automation tools 140. The pipeline stage engine 130 can provide stage data 135 including both the high level representation and the low level representation at different pipeline stages into the matching engine 150.

The logical equivalence check system 100 can include a matching engine 150 configured to receive the stage data 135 at high level and low level representations 145 of the stage data. The logical equivalence check system 100 can compare the high level representations with the low level representations for each stage of the multiple stages to determine whether the LEC performed for the stage succeeds or fails for the pipeline stage in the circuit design included in the input data 110. If the LEC performed for one of the multiple pipeline stages in an overall circuit design fails, the LEC for the overall circuit design fails.

The matching engine 150 can implement various algorithms to perform the comparison, e.g., using SMT or SAT solvers as described above. One example of an SMT solver is the Z3 SMT solver, which includes specialized algorithms for solving background theories. The matching engine 150 can be configured to convert data structures for high level representations and low level representations of stages in the circuit design into a data structure that is suitable for a particular solver. For example, the matching engine 150 can convert stage representations into respective Z3 trees when the system 100 implements a Z3 SMT solver, and provide the converted Z3 trees as input to a solver.

As described above, the logical equivalence check system 100 can generate output data 160 for processing input data 110 in response to user requests 120. The output data 160 can include an indication representing a result of an LEC for the input high level representation. For example, the output data can return a Boolean value "true" if the LEC passes, or a Boolean value "false" if the LEC fails. In addition, the output data can include the input data that causes "failure" results when evaluated by the two representations (i.e., the high level representation and the low level representation). Alternatively or in addition, the output data can still include the input data even if the output data indicates an LEC pass.

Figure 2:
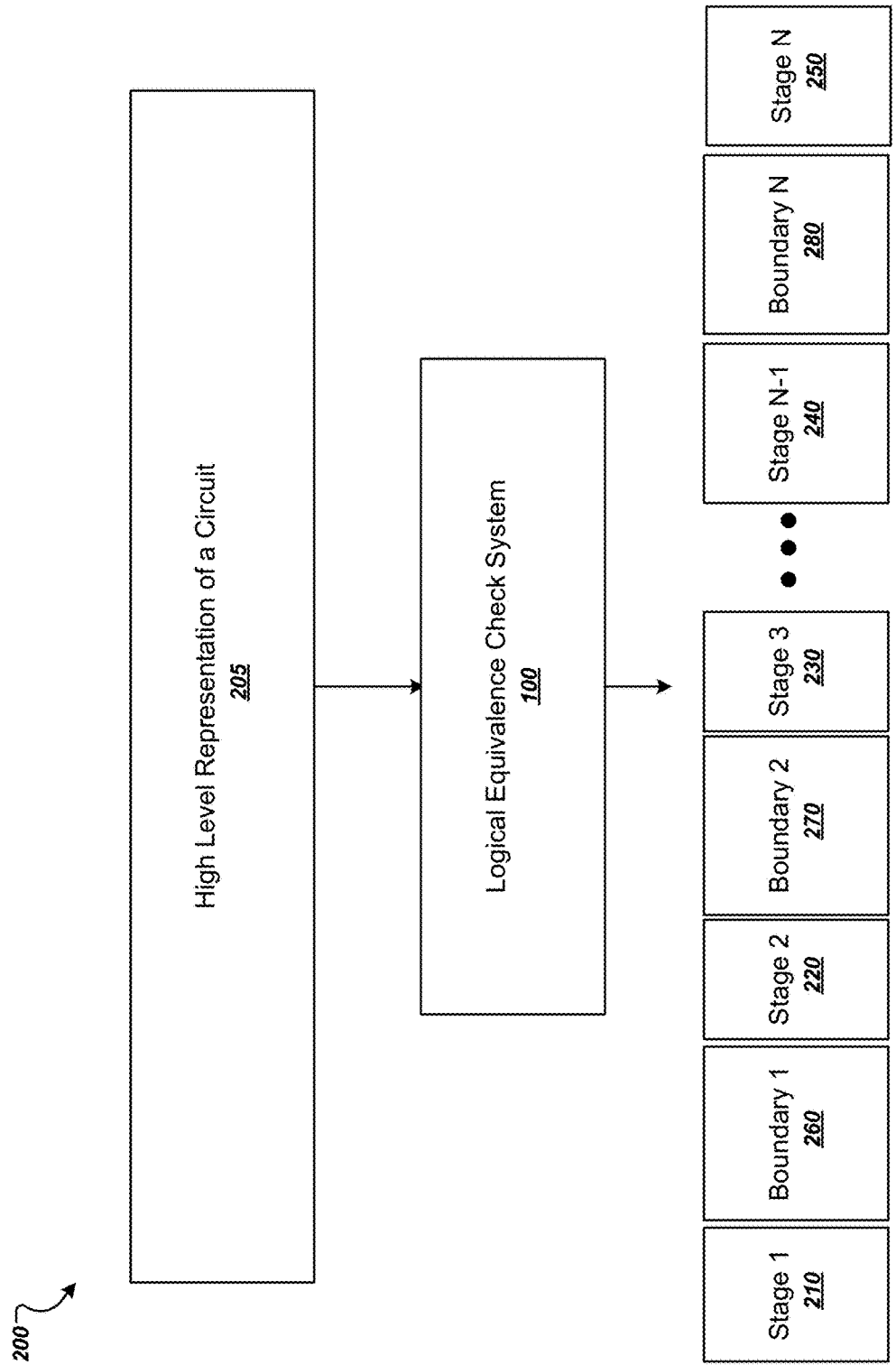
FIG. 2 illustrates an example process for determining multiple pipeline stages for a high level representation of a circuit.

FIG. 2 illustrates an example process 200 for determining multiple pipeline stages for a high level representation 205 of a circuit design. The high level representation 205 of a circuit design can be equivalent to high level representations included in input data 110 of FIG. 1. The multiple stages 210, 220, 230, 240, and 250 can be equivalent to data included in the stage data 135 of FIG. 1. For convenience, the above-noted process 200 is described as being performed by a system of one or more computers located in one or more locations. For example, a system, e.g., the logical equivalence check system 100 of FIG. 1, appropriately programmed, can perform the process 200.

As shown in FIG. 2, the logical equivalence check system 100 can analyze a high level representation of a circuit design 205 and generate multiple stages based on the analysis. More specifically, the system can determine multiple stages 210, 220, 230, 240, and 250 based on respective groups of nodes, and multiple boundaries 260, 270, and 280 that each are between two neighboring stages. For example, the boundary 260 is between stage 210 and stage 220, the boundary 270 is between stage 220 and stage 230, and boundary 280 is between stage 240 and stage 250.

As described above, the system can determine stages based on a schedule for executing instructions for performing respective functionalities in a circuit design. Each stage 210, 220, 230, 240, or 250 can include a respective group of nodes connecting respective circuit components for performing respective functionalities within the stage. Each stage can receive respective input data and generate corresponding output data for the input data when performing corresponding instructions.

The system can track the data transfer between neighboring stages to generate boundaries that connect neighboring stages. For example, the boundary 260 can include one or more input nodes, which are nodes connecting registers for temporarily storing output data from stage 210. The boundary 260 can include one or more output nodes, which are nodes connecting registers for providing input data to stage 220. Note the input nodes and output nodes can have different node sets, and the system can determine the input nodes and output nodes based on connectivity for a stage. For example, the system can determine IR nodes in a pipeline stage that do not have input edges or output edges in the pipeline stage, and add these IR nodes (or find netlist cells with names matching these IR nodes) as input nodes or output nodes for the pipeline stage.

In general, the system can determine pipeline stages represented at a high level and a low level by identifiers. The identifiers can include one or more operation names for operations performed at a pipeline stage, one or more nodal names, and one or more input names or output names. For example, an IR node at a high level representation has a corresponding nodal name represented at a low level. The system can determine whether a pipeline stage presented at a low level includes the same node that corresponds to the IR node by searching for the nodal name in a netlist.

In some implementations, the system can determine a pipeline stage by determining the corresponding boundaries of the pipeline stage. As described above, a boundary can include one or more nodes for transferring data between neighboring stages. The system can determine identifiers for the one or more nodes in the boundaries at both the high level and the low level, and determine a pipeline stage at both the high level and the low level based on the corresponding identifiers for the boundaries.

As described above, because the system keeps track of input data to a stage and output data from a stage, the system can perform LECs on each stage of multiple stages 210, 220, 230, 240, and 250 independently and/or in parallel, thus provides a divide and conquer solution for performing the LEC on a large circuit design. This substantially increases the speed and efficiency in performing the LEC relative to performing the LEC on the entire circuit design at once.

Figure 3:
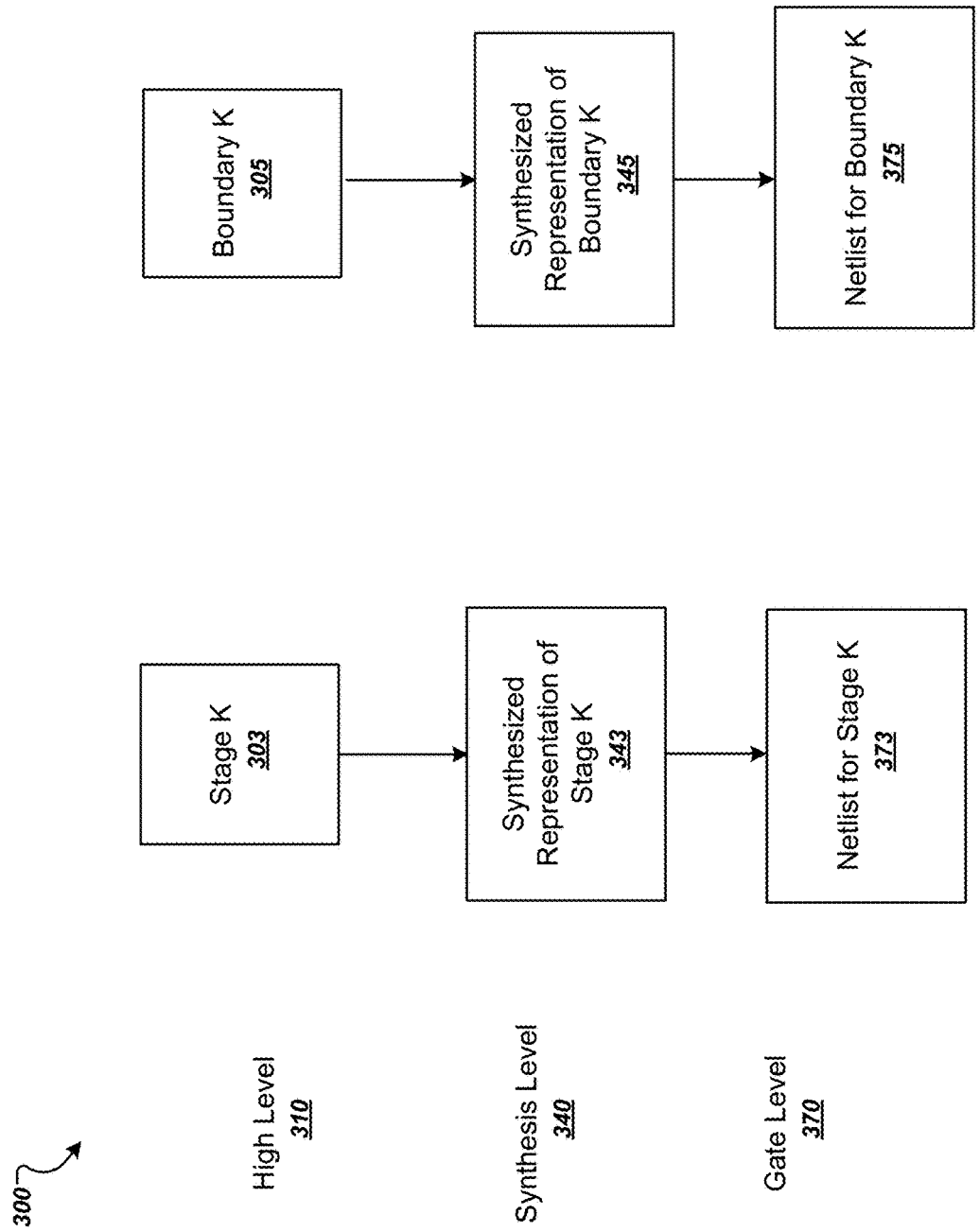
FIG. 3 illustrates an example process for converting high level representations of circuits into low level representations of circuits.

FIG. 3 illustrates an example process 300 for converting high level representations of circuit designs into low level representations of circuit designs. The stage 303 of a circuit design can be equivalent to any one of stages 210, 220, 230, 240, or 250 of FIG. 2. The boundary 305 of a circuit design can be equivalent to any one of boundaries 260, 270, or 280 of FIG. 2. For convenience, the above-noted process 300 is described as being performed by a system of one or more computers located in one or more locations. For example, a system, e.g., the logical equivalence check system 100 of FIG. 1, appropriately programmed, can perform the process 300.

As described above, the system can convert a high level representation of a circuit design to a low level representation. The conversion can include one or more levels between the high level and the low level. For example, the system can process a circuit design represented at a high level 310 (e.g., at Verilog level, boundary behavioral level, or an intermediate representation level) to generate lower level representations, and process the lower level representations to generate low level representations. The lower representations of a circuit design can be representations at a synthesis level 340. For example, a Verilog-level representation of a circuit design can be synthesized, by the system, into a synthesis-level representation. The low level representations can include gate-level representation 370. For example, a synthesis level representation of a circuit design can be converted or translated into a gate level representation, a gate level representation can include a netlist of nodes that correspond to IR nodes at the high level.

As shown in FIG. 3, a stage 303 can be initially represented at a high level 310, e.g., represented by multiple IR nodes. The high level representation of the stage 303 can be synthesized into synthesis level 340, by the system, as a synthesized representation of the stage 343. The system can further convert the synthesized representation 343 of the stage into the gate level 370, e.g., a netlist 373 of particular placements and routing of nodes and components for the stage at the gate level. The system can determine, based on identifiers (e.g., nodal names), input nodes and output nodes in a stage at both the high level representation and the low level representation, and perform LECs based on the determined input nodes and output nodes. The details of the determination process are described below.

Similarly, a boundary 305 can be initially represented at a high level 310, e.g., IR nodes such as registers for receiving input data and/or transmitting output data for corresponding stages. The high level representation of the boundary 305 can be synthesized into the synthesis level 340, by the system, as a synthesized representation of boundary 345. The system can further convert the synthesized representation 345 into the gate level 343, e.g., a netlist 375 of nodes for providing input and/or output to corresponding stages at the gate level. The system can maintain the boundaries and corresponding identifiers throughout each stage of synthesis such that the identifiers can be used to identify the stages identified by the identifiers at both the high and low level representations. This enables the system to identify and compare the high and low level representations of each stage.

The system can determine stages using boundary information based on identifiers for corresponding boundaries. In some implementations, the system can determine respective high level identifiers (e.g., a high level name) for IR nodes in the boundary 305 at the high level 310, and determine corresponding low level identifiers (e.g., low level names) for nodes in the netlist 375 that correspond to the IR nodes in the boundary 305. The system maintains data representing both high level identifiers and low level identifiers for the boundary 305. The system can thus determine corresponding stages by determining nodes that are configured to transmit data between corresponding boundaries at both the high level and the low level.

Figure 4:
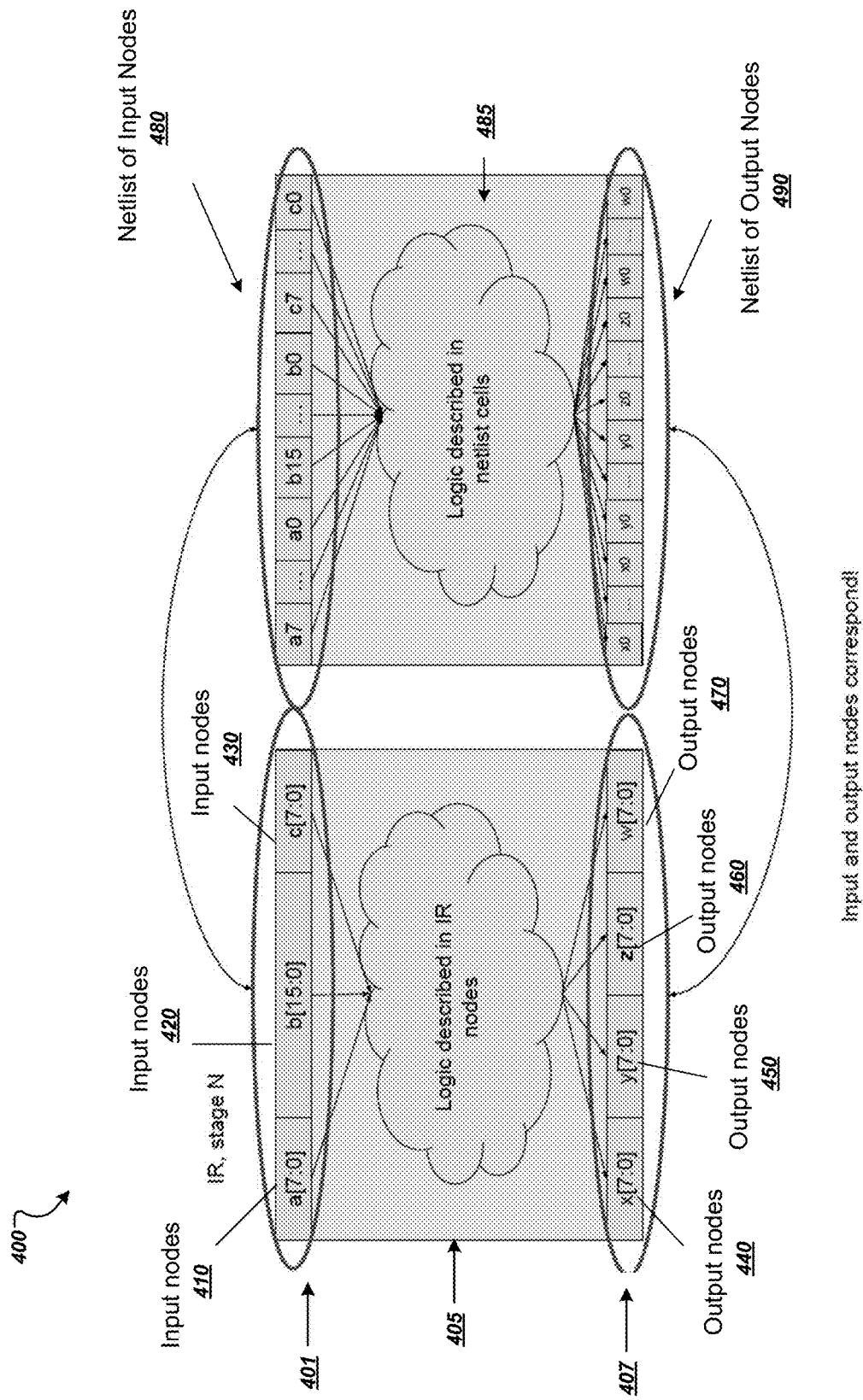
FIG. 4 illustrates an example process of matching a high level representation of a circuit and a low level representation of a circuit for a pipeline stage.

FIG. 4 illustrates an example process 400 of matching a high level representation of a circuit design and a low level representation of a circuit design for a pipeline stage. The high level representation 405 of a circuit design can be equivalent to stage 303 at the high level 310 of FIG. 3. The low level representation 485 of a circuit design can be equivalent to netlist 373 for the stage at the gate level 370 of FIG. 3. For convenience, the above-noted process 400 is described as being performed by a system of one or more computers located in one or more locations. For example, a system, e.g., the logical equivalence check system 100 of FIG. 1, appropriately programmed, can perform the process 400.

As shown in FIG. 4, before comparing the high level representation 405 of a stage and the low level representation 485 of the stage, the system can first match input nodes and output nodes for a stage represented at the high level and the low level. As described above, input nodes and output nodes can be represented in a boundary at a high or low level. For example and as shown in FIG. 4, input nodes 410, 420, and 430, and output nodes 440, 450, 460, and 470 can be represented at a high level for the high level representation of stage 405. The input nodes 410, 420, and 430 can be included in a first boundary 401 to the stage 405 at the high level. The output nodes 440, 450, 460, and 470 can be included in a second boundary 407 to the stage 604 at the high level. In general, the input nodes or output nodes can be equivalent to the boundary 305 at high level 310 of FIG. 3. Similarly, the system can generate netlists of input nodes 480 and output nodes 490 for the corresponding stage 485 at the low level (e.g., gate level). The netlists can be equivalent to netlist 375 for the corresponding boundary at gate level 370 of FIG. 3.

The system can track identifiers (e.g., nodal names) for input nodes 410, 420, and 430 when converting from a high level representation of a stage into a low level representation of the stage. For example, the nodes a7 to a0 included in the netlist 480 correspond to the first set of input nodes 410 (e.g., a[7:0]), the nodes b15 to b0 included in the netlist 480 correspond to the second set of input nodes 420 (e.g., b[15:0]), and the nodes c7 to co included in the netlist 480 correspond to the third set of input nodes 430 (e.g., c[7:0]).

Similarly, the system can track corresponding identifiers (e.g., nodal names) for output nodes 440, 450, 460, and 470 when converting from a high level representation of a stage into a low level representation of the stage. For example, the nodes x7 to x0 included in the netlist 490 correspond to the first set of output nodes 440 (e.g., x[7:0]), the nodes y7 to y0 included in the netlist 490 correspond to the second set of output nodes 450 (e.g., y[7:0]), the nodes z7 to z0 included in the netlist 490 correspond to the third set of output nodes 460 (e.g., z[7:0]), and the nodes w7 to w0 included in the netlist 490 correspond to the fourth set of output nodes 470 (e.g., w[7:0]).

In general, the system needs to match the high level representations of the input nodes 410, 420, and 430 for the stage and the low level representations of the corresponding input nodes in the netlist 480 for the stage, and match the high level representations of the output nodes 440, 450, 460, and 470 for the stage and the low level representations of the corresponding output nodes in the netlist 490 for the stage. To match input and output nodes, the system generally compares corresponding nodal names for the input nodes and output nodes in both high level representations and low level representations. For example, a high-level node for a pipeline stage can be named as "add. 74," which represents a result of an eight-bit addition. The high-level nodal name might be found by the system with corresponding low-level nodal names such as "add_74_p1_0," "add_74_p1_1," . . . , and "add_74_p1_7," present at the output boundary of a pipeline stage.

After determining that input nodes and output nodes match in the high level representations and low level representations, the system can perform an LEC for the stage of the circuit design to determine whether the stage of the circuit design performs the same logic or functionality at high level and low level. As described above, a logic or a functionality of the stage can become different between a high level representation and a low level representation due to errors occurring during converting a high level representation of the stage into a low level representation of the stage. After the system determines that the logic or functionality remains the same between the high level representation and low level representation, the system can confirm the logic equivalence of the high level circuit design and the low level implementation. For example, the system can convert logic operations or functionalities at a high level and low level into symbolic Boolean equality expressions and solve the symbolic Boolean equality problems using one or more solvers (e.g., a Z3 SMT solver). In some implementations, the system can solve the symbolic Boolean equality problems based on the matching IR nodes and netlist cells for a corresponding stage.

After determining that the LECs are successfully performed for each pipeline stage of the circuit design (e.g., the logic or functionality remains the same across both the high level representation and the low level representation of the stage), the system can transmit data representing the circuit design to a fabrication system. The fabrication system can manufacture circuits based on the circuit design.

Figure 5:
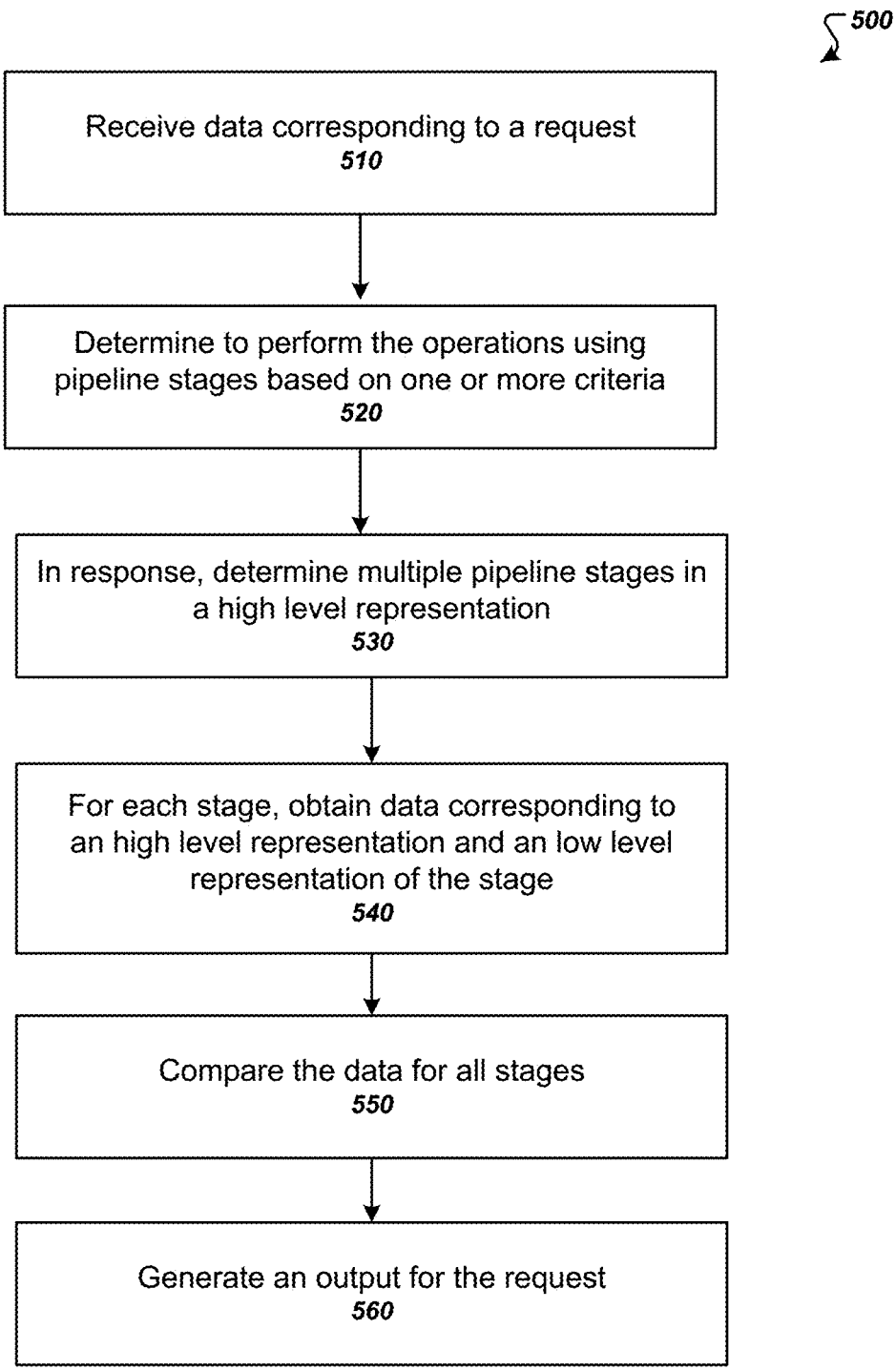
FIG. 5 is a flow diagram of an example process of performing pipeline-stage LECs for a circuit design.

FIG. 5 is a flow diagram of an example process 500 of performing pipeline-stage LECs for a circuit design. For convenience, the above-noted process 500 is described as being performed by a system of one or more computers located in one or more locations. For example, a system, e.g., the logical equivalence check system 100 of FIG. 1, appropriately programmed, can perform the process 500.

The system receives receiving data corresponding to a request (510). The request can include data related to performing operations for examining a functionality of a circuit design. For example, the request can correspond to performing a logical equivalence check (LEC) of a circuit design. As described above, the LEC check can include a pipeline-stage LEC for a circuit design.

The system determines, based on one or more criteria, whether to perform the operations using pipeline stages (520). More specifically, the system can determine the characteristics of the input circuit design. The characteristics of the input circuit design can include, for example, at least one of a time period for performing the LEC on the entire circuit design (e.g., a wall-clock time period), an overall size of the high level representation of the circuit design, or a cost/value for manufacturing one or more components in the circuit design. The system can compare the characteristics with one or more criteria. As described above, the criteria can include at least one of a threshold time period for performing the operations, e.g., ten minutes, one hour, four hours, or other suitable threshold time periods, a threshold size for a high level representation of the circuit design, e.g., 1 Megabytes, 100 Megabytes, 1 Gigabytes, 10 Gigabytes, or other suitable overall sizes. or a threshold cost value corresponding to the circuit design. As a more concrete example, a 4-by-4 32-bit vector product unit in a systolic array includes around 450 IR nodes in a low representation or a corresponding number of high level nodes in a high level representation. The circuit design, when converted into a textual form, can have a size around 32 Kilobytes. The system can compare one or more of the time period, overall design size, or the cost with the predetermined threshold values to determine whether to perform the operations of LECs using pipeline stages. When the system determines that the characteristics satisfy the corresponding criteria, the system can perform a regular LEC without determining pipeline stages for the circuit design. When the system determines that the characteristics do not satisfy corresponding criteria, the system can determine not to perform the LECs for pipeline stages of the circuit design, but to perform the LEC on the entire circuit design.

One example algorithm for determining whether to perform the operations using pipeline stages is presented below:

```
//Determine if we should do a staged or full LEC.
should_do_staged(ir) {
   if ir.size>MAX_SIZE: return true
   for node in ir {
   if is_expensive(node): return true
   }
   return false}
}
```

The should_do_staged( ) algorithm receives the high-level representation of a circuit design as input (e.g., intermediate representation (IR) of the circuit design), and generates Boolean value as output indicating whether to perform pipeline-stage LEC on an entire circuit design. The IR of the circuit design is generally higher than the register transfer level. As shown in the should_do_staged( ) algorithm, the system determines not to perform pipeline-stage LEC on a circuit design if the output is "false," and to perform pipeline-stage LEC on the circuit design if the output is "true."

In response to determining to perform the operations using pipeline stages, the system determines multiple pipeline stages in a high level representation of the circuit design (530). The system can determine multiple pipeline stages for a circuit design based on a schedule for performing functionalities in an order.

An example algorithm for determining multiple pipeline stages is presented below:

```
//Divide the input IR nodes into individual pipeline
   stages.
divide_into_stages(ir, schedule, netlist) {
   for node in design {
      stage:=schedule(node)
      ir_stages[stage].insert(node)
   }
   return ir_stages
}
```

The divide_into_stages( ) algorithm receives data representing a schedule. The schedule can specify an order for performing operations for a stage represented at a high level and at a low level. The divide_into_stages( ) algorithm also receives IR at a high level, and the corresponding netlist of the IR at a low level as input. The divide_into_stages( ) algorithm generates multiple stages as output based at least on the above-noted input.

In addition to generating multiple stages, the system can also track data transfer across stages, and generate multiple boundaries each between two neighboring stages of the multiple stages. Each boundary can include multiple IR nodes at a high level and a corresponding netlist at a low level. The nodes in a boundary can include input nodes configured to provide inputs to a stage and output nodes configured to receive outputs from a stage.

One example algorithm to determine input nodes and output nodes is presented below:

```
//Find the set of netlist nodes comprising the inputs to an
   individual pipeline stage,
//using the set of IR nodes comprising those inputs as a
   guide.
get_netlist_inputs(ir_nodes, netlist) {
   netlist_inputs:=[ ]
   for ir_node in ir_nodes:
      if ir_node has no input edges in this pipeline
         stage {
      netlist_nodes=//find netlist cells with names
         matching ir_node
      netlist_inputs.insert(netlist_nodes)
      }
   return netlist_inputs
}
//Find the set of netlist nodes comprising the outputs to an
   individual pipeline stage,
//using the set of IR nodes comprising those outputs as a
   guide.
get_netlist_outputs(ir_nodes, netlist) {
   netlist_outputs:=[ ]
   for ir_node in ir_nodes {
      if ir_node has no input edges in this pipeline
         stage {
      netlist_nodes=//find netlist cells with names
         matching ir_node
      netlist_outputs.insert(netlist_nodes)
      }
   return netlist_outputs
   }
```

For each stage of the multiple pipeline stages, the system obtains data corresponding to a high level representation of the stage, and obtains data corresponding to a low level representation of the stage based on the data corresponding to the high level representation of the stage (540). As described above, the high level representation of a stage can include an intermediate representation of the stage, which is generally at a higher level than the RTL. The system can use one or more automation tools to convert a high level representation of a pipeline stage into a low level representation (e.g., a gate level netlist). For example and referring back to FIG. 4, the system determines nodes included in boundaries for a given stage, e.g., input nodes and output nodes for a given stage, at both the high level representation and low level representation. The system tracks these nodes based on respective identifiers as described above.

For each boundary for a pipeline stage, the system determines high level identifiers for nodes included in a boundary at the high level representation (e.g., identifiers for input nodes and/or output nodes at the IR level); and determines low level identifiers for these nodes included in the boundary at the low level representation (e.g., identifiers for corresponding input nodes and/or output nodes at the gate level). Each of the low level identifiers corresponds to a high level identifier of the high level identifier, e.g., a one-to-one mapping between the high level representations and the low level representations. For example, the system determines, based on the respective identifiers, whether the input nodes at the high level match with corresponding input nodes at the low level, whether the output nodes at the high level match with corresponding output nodes at the low level, or whether other nodes connecting the input and output nodes at the high level match with corresponding other nodes at the low level.

The system compares the data corresponding to the high level representation and low level representation for the stage (550). As described above, the system can transform the high level representation and low level representation of a stage (and optionally corresponding boundaries) into symbolic Boolean equality problems, and implement various solvers (e.g., SAT or SMT solvers) to solve the equality problems. For example, the system can implement a Z3 solver for the comparison. An example algorithm is presented below:

```
//For each stage, perform a topographical sort over the
    netlist nodes in the pipeline stage,
//creating a Z3 translation for each encountered node.
convert_netlist_to_z3(netlist_inputs, netlist_outputs) {
    work_list:=netlist_inputs
    z3_nodes=[ ]
    while (!work_list.empty( )) {
        work:=work_list.pop_front( )
        z3_nodes.append (convert_node_to_z3(work))
        for node in work.downstream_nodes {
//only add a "downstream" node to work_list if it's still in
    this pipeline stage
            if all inputs to node have been processed AND work is
                not in netlist_outputs:
            work_list.append(node)
        }
    }
    return z3_nodes
}
//Create common input nodes for the IR and netlist Z3
    trees, thus unifying them into a single computation.
unify_inputs(ir_z3, netlist_z3) {
    for node in ir_z3 {
        nodes=node+<matching nodes in netlist z3>
        parent_node=z3_add_node( )
        parent_node.add_children(nodes)
    }
}
```

As described above, the system can, using the convert_netlist_to_z3( ) algorithm, convert input netlist and output netlist at a gate level for a stage into a data structure suitable for Z3 SMT solver. More specifically, the system can determine a set of input nodes for the high level representation of the stage and the low level representation of the stage, e.g., a Z3 translation of the input nodes at the IR level and the gate level, respectively. The system can determine a set of output nodes for the high level representation of the stage and the low level representation of the stage, e.g., a Z3 translation of the output nodes at the IR level and the gate level, respectively.

The system can include the unify-inputs ( ) algorithm to unify input IR nodes and corresponding Z3 trees into a single computation. The system can include a unify-outputs( ) algorithm, similar to the unify-inputs ( ) algorithm, to unify output IR nodes and their corresponding Z3 trees into a single computation. The system can perform comparisons for the LEC based on the set of input nodes (e.g., Z3 translation of input IR nodes and input netlists) and the set of output nodes (e.g., Z3 translation of output IR nodes and output netlists). The comparisons can be performed by calling a Z3 solver for the input nodes and output nodes.

The system can generate, using the unify_inputs ( ) algorithm, unified Z3 logic trees for the Z3 SMT solver to determine whether the high level representation and the low level representation of the stage are equal.

The system generates an output, based on the comparisons, in response to the request (550). The output can include a Boolean value representing whether a circuit design passes or fails the LEC. The Boolean value can include "true" and "false," as described above.

When the system determines to perform an LEC on a circuit design without using pipeline-stage techniques, the system can perform the LEC using the entire circuit design, and monitor an elapsed time spent for performing the operations based on the entire circuit design. The system can determine whether that elapsed time exceeds a threshold time period for performing the operations. In response to determining that the elapsed time exceeds the threshold time period, the system can abort the current operations and initiate performing the operations using pipeline stages. One example algorithm is presented below:

```
//Perform a full LEC, aborting to single-stage LECs if a
    timeout is tripped.
perform full_lec (ir, pipeline_schedule, netlist) {
    result:=start_full_lec(max_time=MAX_TIME)
    if result==TIMED_OUT {
        return perform_staged_lec (ir, pipeline_schedule,
            netlist)
    } else {
        return result
    }
}
```

The system can apply one or more driver algorithms to initiate the process 500. One example driver algorithm is presented below:

```
//Drive the process of performing a series of single-stage
    LECs.
perform_staged_lec (ir, pipeline_schedule, netlist) {
    stages=divide_into_stages(ir,     pipeline_schedule,
        netlist)
    for ir_nodes in stages {
        netlist_inputs:=get_netlist_inputs (ir_nodes, netlist)
        netlist_outputs:=get_netlist_outputs    (ir_nodes,
            netlist)
        ir_z3:=convert_ir_to_z3(ir_nodes)
        netlist_z3:=convert_netlist_to_z3(netlist,    net-
            list_inputs, netlist_outputs)
        unify_inputs (ir_z3, netlist_z3)
        result:=compare_outputs(ir_z3, netlist_z3)
        if result==NOT_EQUAL: return false
    }
}
//Driver process for all the above.
perform_lec (design, pipeline_schedule, netlist) {
    do_staged:=should_do_staged (design)
    if do_staged {
        return perform_staged_lec(design, pipeline_sched-
            ule, netlist)
    } else {
        return perform_full_lec(design)
    }
}
```

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it, software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method including receiving a request for performing operations of a logical equivalence check of a circuit design; determining, based on one or more criteria, to perform the operations using pipeline stages; in response to determining to perform the operations using pipeline stages: determining a plurality of pipeline stages of the circuit design that is in a high level representation; and for each stage of the plurality of pipeline stages: obtaining data corresponding to a high level representation of the stage, obtaining data corresponding to a low level representation of the stage based on the data corresponding to the high level representation of the stage, and comparing the data corresponding to the high level representation to the data corresponding to the low level representation for the stage; and generating an output, based on the comparison for each stage of the plurality of pipeline stages, in response to the request.

Embodiment 2 is the method of Embodiment 1, comprising receiving another request for performing operations of a logical equivalence check of another circuit design; determining, based on one or more criteria, not to perform the operations using pipeline stages; and in response, performing the operations of the logical equivalence check without using pipeline stages for the entire circuit design.

Embodiment 3 is the method of Embodiment 1 or 2, wherein the one or more criteria comprises at least one of a threshold time period for performing the operations based on the entire circuit design, a threshold size for a high level representation of the circuit design, or a threshold cost value corresponding to one or more components in the circuit design.

Embodiment 4 is the method of any one of Embodiments 1-3, wherein, for each stage of the plurality of stages, the data corresponding to the high level representation of the stage comprises an intermediate representation that is at a higher level than a register transfer level.

Embodiment 5 is the method of any one of Embodiments 1-4, wherein, for each stage of the plurality of stages, the data corresponding to the low level representation of the stage comprises a respective set of netlist nodes.

Embodiment 6 is the method of any one of Embodiments 1-5, wherein determining the plurality of pipeline stages in the high level representation of the circuit design further comprises: determining a plurality of boundaries each between two neighboring stages of the plurality of stages, wherein each boundary includes one or more nodes configured to transmit data between two neighboring stages.

Embodiment 7 is the method of Embodiment 6, further comprises: maintaining data representing the plurality of boundaries at the high level representation and at the low level representation, wherein the maintaining comprises: for each of the plurality of boundaries: determining high level identifiers for the one or more nodes in the boundary at the high level representation; and determining low level identifiers for the one or more nodes in the boundary at the low level representation, wherein each of the low level identifiers corresponds to a respective high level identifier of the high level identifiers.

Embodiment 8 is the method of any one of Embodiments 1-7, further comprising: for each stage of the plurality of stages: determining a set of input nodes for the high level representation of the stage and the low level representation of the stage; determining a set of output nodes for the high level representation of the stage and the low level representation of the stage; and performing, based on the set of input nodes and the set of output nodes, the comparison between the high level representation of the stage and the low level representation of the stage.

Embodiment 9 is the method of any one of Embodiments 1-8, further comprising: initiating performance of the operations of the logical equivalence check without using pipeline stages for the entire circuit design; monitoring an elapsed time spent performing the operations; determining that the elapsed time exceeds a threshold time period for performing the operations; and in response to determining the elapsed time exceeds the threshold time period, aborting the current operations and initiating performing the operations using pipeline stages.

Embodiment 10 is a system comprising one or more computers and one or more storage devices storing instructions that, when executed by the one or more computers, cause the one or more computers to perform operations of the method of any one of Embodiments 1-9.

Embodiment 11 is one or more computer storage media storing instructions that, when executed by one or more computers, cause the one or more computers to perform operations of the method of any one of Embodiments 1-9.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain cases, multitasking and parallel processing may be advantageous.

What is claimed is:

1. A method comprising:
receiving a request for performing operations of a logical equivalence check of a circuit design;
determining, based on one or more criteria, to perform the operations using pipeline stages;
in response to determining to perform the operations using pipeline stages:
determining a plurality of pipeline stages of the circuit design that is in a high level representation; and
for each stage of the plurality of pipeline stages:
obtaining data corresponding to a high level representation of the stage,
obtaining data corresponding to a low level representation of the stage based on the data corresponding to the high level representation of the stage, and
comparing the data corresponding to the high level representation to the data corresponding to the low level representation for the stage; and
generating an output, based on the comparison for each stage of the plurality of pipeline stages, in response to the request.

2. The method of claim 1, further comprising:
receiving another request for performing operations of a logical equivalence check of another circuit design;
determining, based on one or more criteria, not to perform the operations using pipeline stages; and
in response, performing the operations of the logical equivalence check without using pipeline stages for the entire circuit design.

3. The method of claim 2, further comprising:
initiating performance of the operations of the logical equivalence check without using pipeline stages for the entire circuit design;
monitoring an elapsed time spent performing the operations;
determining that the elapsed time exceeds a threshold time period for performing the operations; and
in response to determining the elapsed time exceeds the threshold time period, aborting the current operations and initiating performing the operations using pipeline stages.

4. The method of claim 1, wherein the one or more criteria comprises at least one of a threshold time period for performing the operations based on the entire circuit design, a threshold size for a high level representation of the circuit design, or a threshold cost value corresponding to one or more components in the circuit design.

5. The method of claim 1, wherein, for each stage of the plurality of stages, the data corresponding to the high level representation of the stage comprises an intermediate representation that is at a higher level than a register transfer level.

6. The method of claim 1, wherein, for each stage of the plurality of stages, the data corresponding to the low level representation of the stage comprises a respective set of netlist nodes.

7. The method of claim 1, wherein determining the plurality of pipeline stages in the high level representation of the circuit design further comprises:
determining a plurality of boundaries each between two neighboring stages of the plurality of stages, wherein each boundary includes one or more nodes configured to transmit data between two neighboring stages.

8. The method of claim 7, further comprises: maintaining data representing the plurality of boundaries at the high level representation and at the low level representation, wherein the maintaining comprises: for each of the plurality of boundaries:
determining high level identifiers for the one or more nodes in the boundary at the high level representation; and
determining low level identifiers for the one or more nodes in the boundary at the low level representation, wherein each of the low level identifiers corresponds to a respective high level identifier of the high level identifiers.

9. The method of claim 1, further comprising: for each stage of the plurality of stages:
determining a set of input nodes for the high level representation of the stage and the low level representation of the stage;
determining a set of output nodes for the high level representation of the stage and the low level representation of the stage; and
performing, based on the set of input nodes and the set of output nodes, the comparison between the high level representation of the stage and the low level representation of the stage.

10. A system comprising one or more computers and one or more storage devices storing instructions that, when executed by the one or more computers, cause the one or more computers to perform operations, the operations comprising:
receiving a request for performing operations of a logical equivalence check of a circuit design;
determining, based on one or more criteria, to perform the operations using pipeline stages;
in response to determining to perform the operations using pipeline stages:
determining a plurality of pipeline stages of the circuit design that is in a high level representation; and
for each stage of the plurality of pipeline stages:
obtaining data corresponding to a high level representation of the stage,
obtaining data corresponding to a low level representation of the stage based on the data corresponding to the high level representation of the stage, and
comparing the data corresponding to the high level representation to the data corresponding to the low level representation for the stage; and
generating an output, based on the comparison for each stage of the plurality of pipeline stages, in response to the request.

11. The system of claim 10, wherein the operations further comprise:
- receiving another request for performing operations of a logical equivalence check of another circuit design;
- determining, based on one or more criteria, not to perform the operations using pipeline stages; and
- in response, performing the operations of the logical equivalence check without using pipeline stages for the entire circuit design.

12. The system of claim 10, wherein determining the plurality of pipeline stages in the high level representation of the circuit design further comprises:
- determining a plurality of boundaries each between two neighboring stages of the plurality of stages, wherein each boundary includes one or more nodes configured to transmit data between two neighboring stages.

13. The system of claim 12, wherein the operations further comprise: maintaining data representing the plurality of boundaries at the high level representation and at the low level representation, wherein the maintaining comprises: for each of the plurality of boundaries:
- determining high level identifiers for the one or more nodes in the boundary at the high level representation; and
- determining low level identifiers for the one or more nodes in the boundary at the low level representation, wherein each of the low level identifiers corresponds to a respective high level identifier of the high level identifiers.

14. The system of claim 10, wherein the operations further comprise: for each stage of the plurality of stages:
- determining a set of input nodes for the high level representation of the stage and the low level representation of the stage;
- determining a set of output nodes for the high level representation of the stage and the low level representation of the stage; and
- performing, based on the set of input nodes and the set of output nodes, the comparison between the high level representation of the stage and the low level representation of the stage.

15. The system of claim 10, wherein the operations further comprise:
- initiating performance of the operations of the logical equivalence check without using pipeline stages for the entire circuit design;
- monitoring an elapsed time spent performing the operations;
- determining that the elapsed time exceeds a threshold time period for performing the operations; and
- in response to determining the elapsed time exceeds the threshold time period, aborting the current operations and initiating performing the operations using pipeline stages.

16. One or more non-transitory computer storage media storing instructions that, when executed by one or more computers, cause the one or more computers to perform operations, the operations comprising:
- receiving a request for performing operations of a logical equivalence check of a circuit design;
- determining, based on one or more criteria, to perform the operations using pipeline stages;
- in response to determining to perform the operations using pipeline stages:
  - determining a plurality of pipeline stages of the circuit design that is in a high level representation; and
  - for each stage of the plurality of pipeline stages:
    - obtaining data corresponding to a high level representation of the stage,
    - obtaining data corresponding to a low level representation of the stage based on the data corresponding to the high level representation of the stage, and
    - comparing the data corresponding to the high level representation to the data corresponding to the low level representation for the stage; and
- generating an output, based on the comparison for each stage of the plurality of pipeline stages, in response to the request.

17. The one or more non-transitory computer storage media of claim 16, wherein the operations further comprise:
- receiving another request for performing operations of a logical equivalence check of another circuit design;
- determining, based on one or more criteria, not to perform the operations using pipeline stages; and
- in response, performing the operations of the logical equivalence check without using pipeline stages for the entire circuit design.

18. The one or more non-transitory computer storage media of claim 17, wherein the operations further comprise:
- initiating performance of the operations of the logical equivalence check without using pipeline stages for the entire circuit design;
- monitoring an elapsed time spent performing the operations;
- determining that the elapsed time exceeds a threshold time period for performing the operations; and
- in response to determining the elapsed time exceeds the threshold time period, aborting the current operations and initiating performing the operations using pipeline stages.

19. The one or more non-transitory computer storage media of claim 16, wherein determining the plurality of pipeline stages in the high level representation of the circuit design further comprises:
- determining a plurality of boundaries each between two neighboring stages of the plurality of stages, wherein each boundary includes one or more nodes configured to transmit data between two neighboring stages.

20. The one or more non-transitory computer storage media of claim 16, wherein the operations further comprise: for each stage of the plurality of stages:
- determining a set of input nodes for the high level representation of the stage and the low level representation of the stage;
- determining a set of output nodes for the high level representation of the stage and the low level representation of the stage; and
- performing, based on the set of input nodes and the set of output nodes, the comparison between the high level representation of the stage and the low level representation of the stage.

* * * * *